(12) United States Patent
Akatsu

(10) Patent No.: US 10,782,769 B2
(45) Date of Patent: Sep. 22, 2020

(54) COMMUNICATION DEVICE, COMMUNICATION CONTROLLING METHOD, AND NON-TRANSITORY RECORDING MEDIUM

(71) Applicant: Takahiro Akatsu, Tokyo (JP)

(72) Inventor: Takahiro Akatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 16/135,621

(22) Filed: Sep. 19, 2018

(65) Prior Publication Data
US 2019/0155357 A1 May 23, 2019

(30) Foreign Application Priority Data
Nov. 22, 2017 (JP) .................................. 2017-224520

(51) Int. Cl.
| G06F 1/324 | (2019.01) |
| G06F 1/3296 | (2019.01) |
| G06F 1/3234 | (2019.01) |
| G06F 1/3206 | (2019.01) |
| H04N 1/00 | (2006.01) |

(52) U.S. Cl.
CPC ............ *G06F 1/324* (2013.01); *G06F 1/3206* (2013.01); *G06F 1/3284* (2013.01); *G06F 1/3296* (2013.01); *H04N 1/00* (2013.01); *H04N 1/00896* (2013.01); *H04N 1/00904* (2013.01)

(58) Field of Classification Search
CPC ...... G06F 1/3023; G06F 1/324; G06F 1/3296; G06F 1/3287; G06F 1/3237; G06F 1/3206; G06F 1/3284; H04N 2201/0094

USPC ........................................................ 713/322
See application file for complete search history.

(56) References Cited

U.S. PATENT DOCUMENTS

| 6,128,104 | A * | 10/2000 | Okabe ..................... H04N 1/00 358/442 |
| 7,180,613 | B2 * | 2/2007 | Katsuragi ........ H04N 1/00885 358/1.14 |
| 7,574,613 | B2 * | 8/2009 | Holle .................... G06F 1/3203 713/300 |
| 8,023,842 | B2 * | 9/2011 | Motoyama ......... G03G 15/5004 399/37 |
| 8,315,534 | B2 * | 11/2012 | Yano .................... G03G 15/80 399/88 |

(Continued)

FOREIGN PATENT DOCUMENTS

| JP | 2011-087024 | 4/2011 |
| JP | 2015-170107 | 9/2015 |

*Primary Examiner* — Brian T Misiura
(74) *Attorney, Agent, or Firm* — Oblon, McClelland, Maier & Neustadt, L.L.P.

(57) ABSTRACT

A communication device includes a communication circuit and circuitry. The communication circuit executes a function related to communication. The circuitry detects an input signal input to the communication circuit, transitions the communication device between a first power state, and a second power state in which the communication device consumes less power than in the first power state, and changes a clock frequency of the communication circuit. When the input signal is detected in the second power state of the communication device, the circuitry changes the clock frequency of the communication circuit while maintaining the second power state.

5 Claims, 10 Drawing Sheets

(56) References Cited

U.S. PATENT DOCUMENTS

| | | | |
|---|---|---|---|
| 8,842,304 B2* | 9/2014 | Muramoto | H04N 1/00933 358/1.13 |
| 9,049,331 B2* | 6/2015 | Nasu | G06F 1/3206 |
| 9,430,215 B2* | 8/2016 | Abe | G06F 8/65 |
| 9,544,448 B2* | 1/2017 | Watanabe | H04N 1/00037 |
| 2002/0171861 A1* | 11/2002 | Katsuragi | H04N 1/00885 358/1.14 |
| 2013/0155437 A1* | 6/2013 | Muramoto | H04N 1/00933 358/1.13 |
| 2014/0043636 A1 | 2/2014 | Akatsu | |
| 2017/0315606 A1* | 11/2017 | Tanaka | G06F 1/3287 |

* cited by examiner

FIG. 6

| INITIAL SETTINGS | |
|---|---|
| SETTING TO ALLOW TRANSITION TO LOW-CLOCK ENGINE OFF STATE | ● ALLOW<br>○ DISALLOW<br>[SET] [CANCEL] |

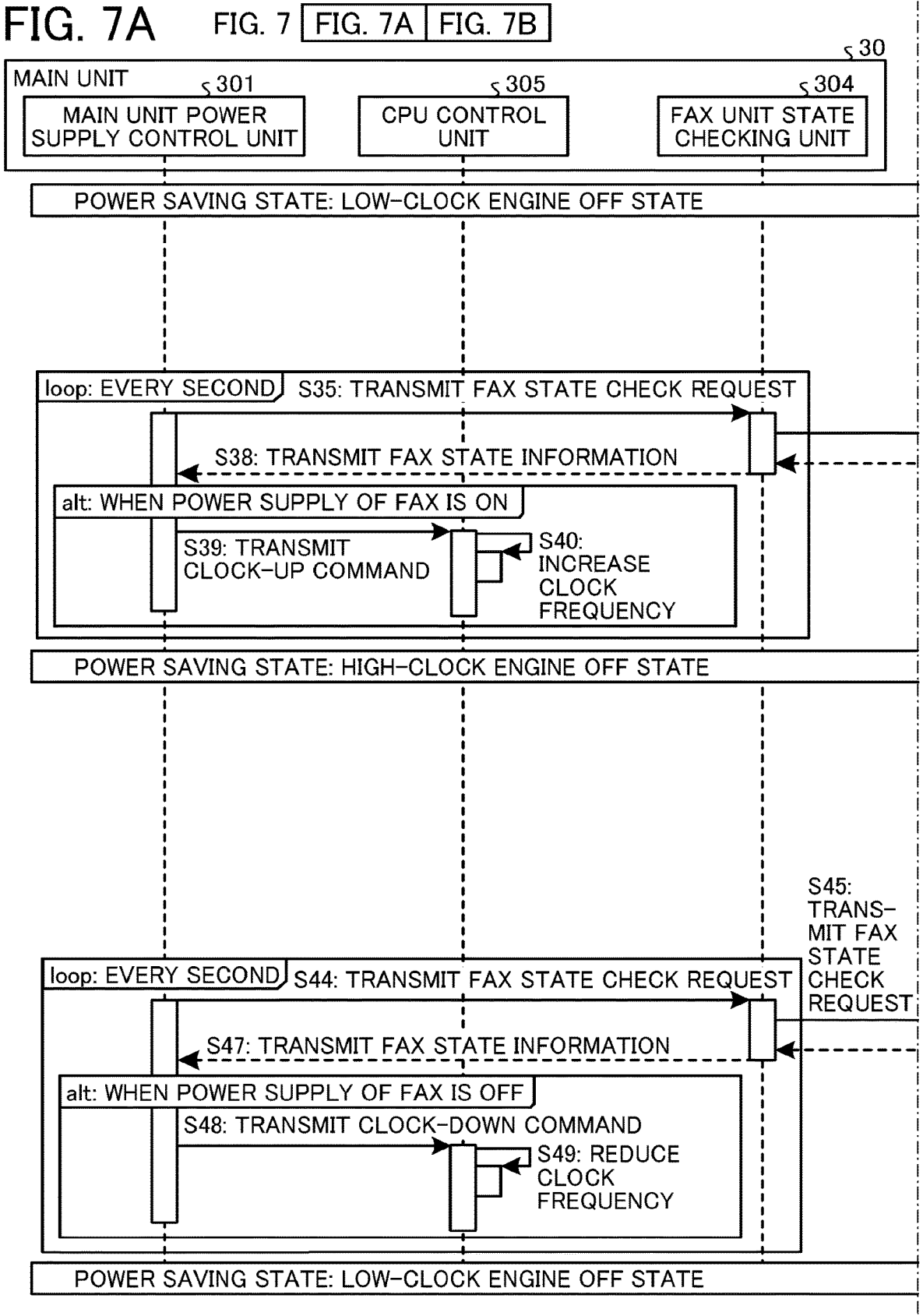

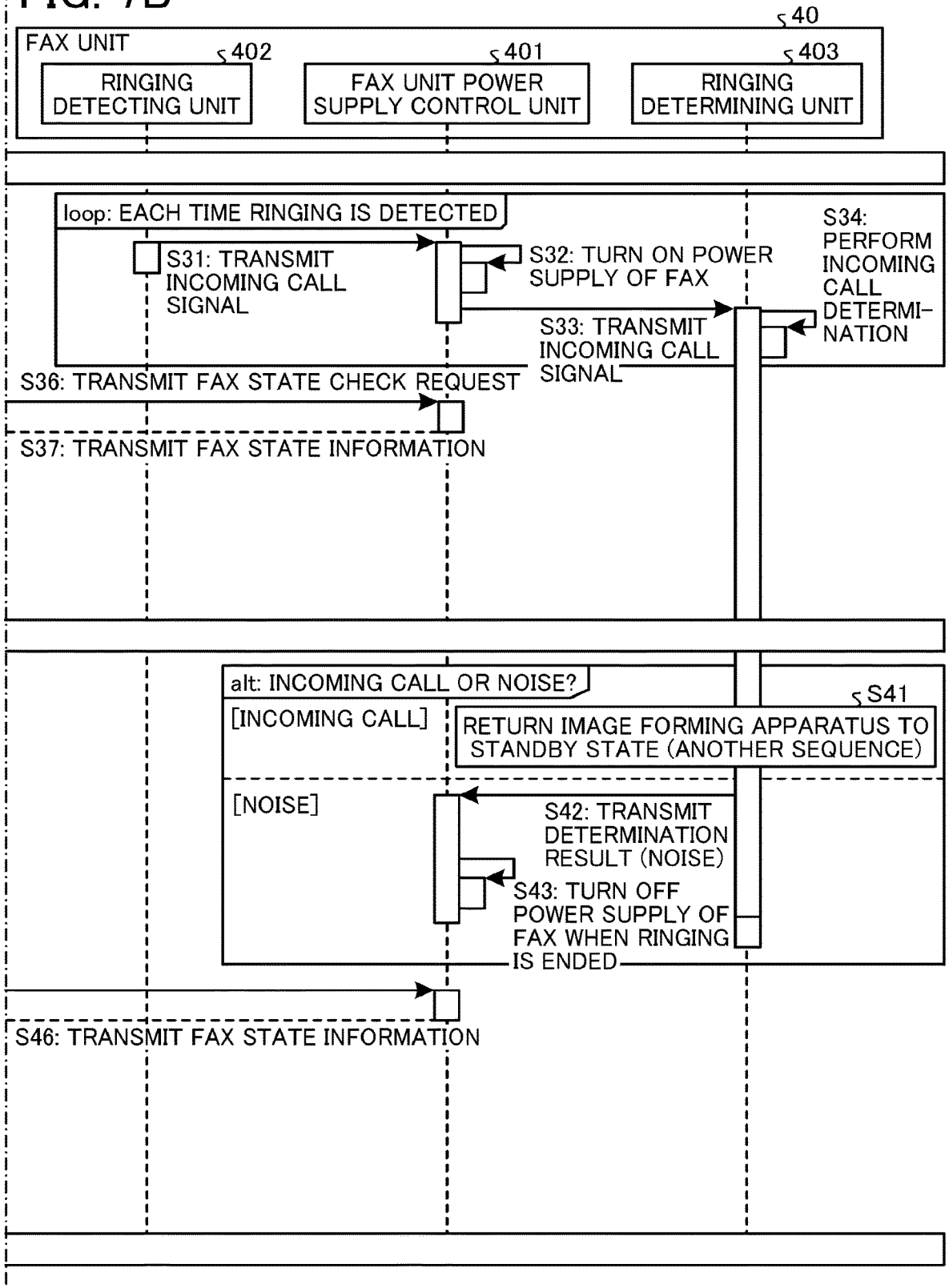

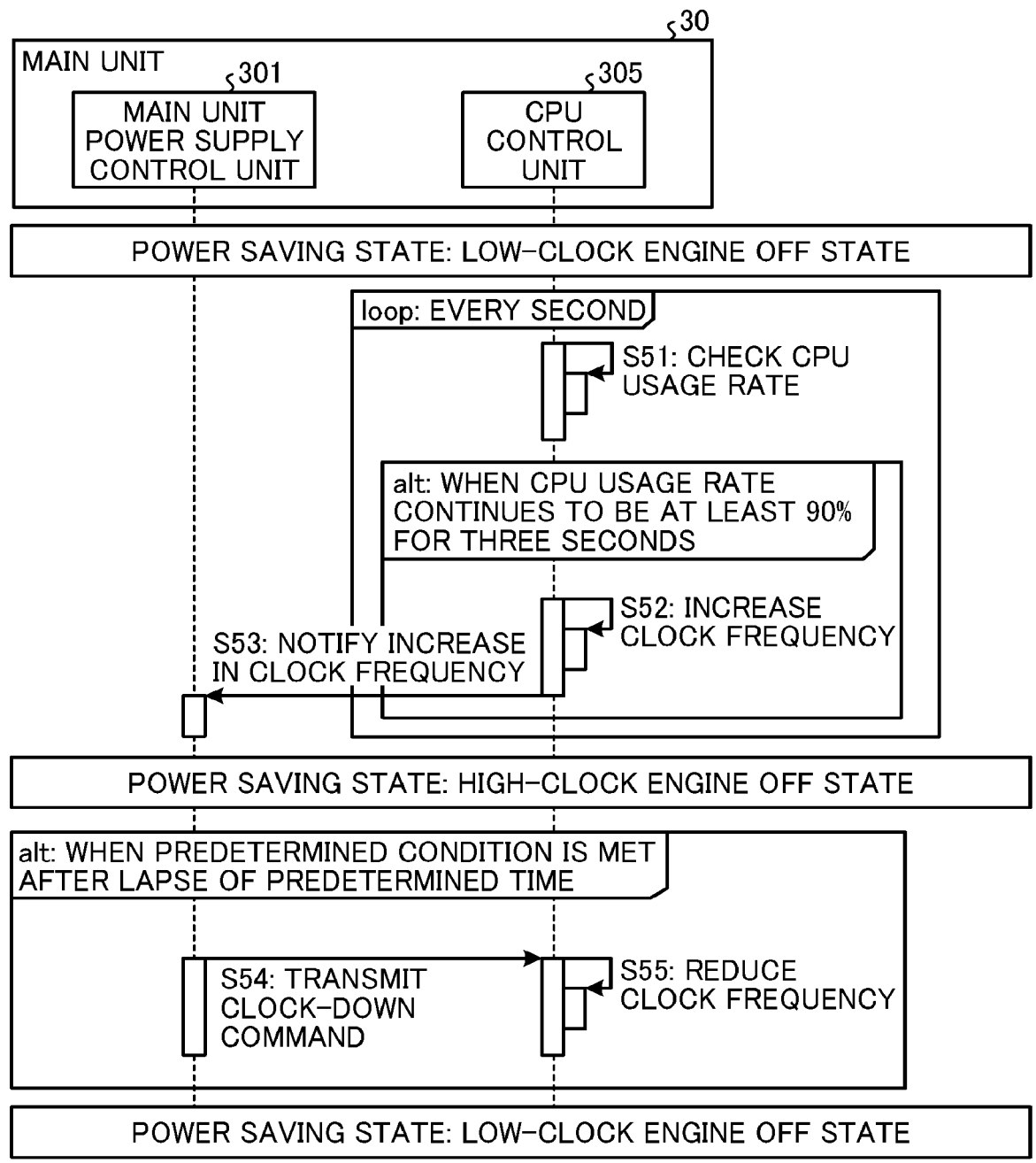

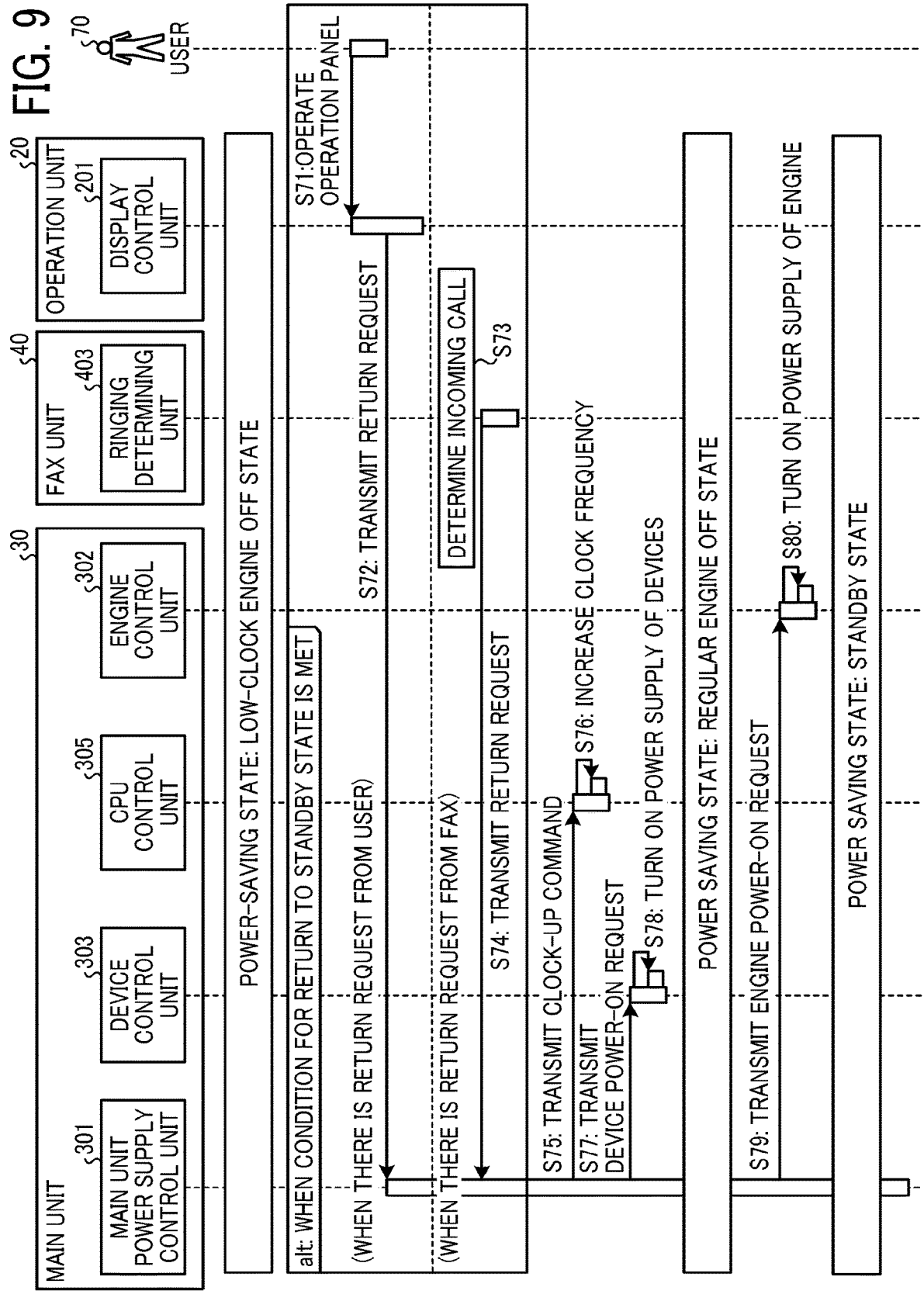

COMMUNICATION DEVICE, COMMUNICATION CONTROLLING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2017-224520 filed on Nov. 22, 2017, in the Japan Patent Office, the entire disclosure of which is hereby incorporated by reference herein.

BACKGROUND

Technical Field

The present invention relates to a communication device, a communication controlling method, and a non-transitory recording medium.

Description of the Related Art

There is a technique of bringing a multifunction peripheral (MFP) into an engine off state in which all engines of the MFP are stopped to reduce power consumption of the MFP in power saving mode. There is also a method of reducing the clock frequency of a central processing unit (CPU) to reduce power consumption of a personal computer (PC), for example. These techniques may be combined to provide a power saving system that reduces power consumption by reducing the clock frequency of the CPU in the engine off state of the MFP. Such a technique of controlling the clock frequency of the CPU includes a technique of a network packet relay device that increases or reduces the clock frequency of the CPU based on a threshold of a CPU usage rate or the difference in power level to thereby control the level of power consumption.

SUMMARY

In one embodiment of this invention, there is provided an improved communication device that includes, for example, a communication circuit and circuitry. The communication circuit executes a function related to communication. The circuitry detects an input signal input to the communication circuit, transitions the communication device between a first power state, and a second power state in which the communication device consumes less power than in the first power state, and changes a clock frequency of the communication circuit. When the input signal is detected in the second power state of the communication device, the circuitry changes the clock frequency of the communication circuit while maintaining the second power state.

In one embodiment of this invention, there is provided an improved communication controlling method for a communication device including a communication circuit that executes a function related to communication. The communication controlling method includes, for example, detecting an input signal input to the communication circuit, transitioning the communication device between a first power state, and a second power state in which the communication device consumes less power than in the first power state, changing a clock frequency of the communication circuit, and when the input signal is detected in the second power state of the communication device, changing the clock frequency of the communication circuit while maintaining the second power state.

In one embodiment of this invention, there is provided a non-transitory recording medium storing a plurality of instructions for a communication device including a communication circuit that executes a function related to communication. When executed by one or more processors, the plurality of instructions cause the processors to perform the above-described communication controlling method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of a screen for setting whether to allow the image forming apparatus according to the embodiment to transition to the low-clock engine off state;

FIGS. 7A and 7B are a sequence diagram illustrating an example of an operation in which the image forming apparatus according to the embodiment transitions from the low-clock engine off state to a high-clock engine off state in response to an incoming call signal;

FIG. 8 is a sequence diagram illustrating an example of an operation in which the image forming apparatus according to the embodiment transitions from the low-clock engine off state to the high-clock engine off state based on a CPU usage rate; and FIG. 9 is a sequence diagram illustrating an example of an operation in which the image forming apparatus according to the embodiment returns to a standby state from the low-clock engine off state.

Figure 1:
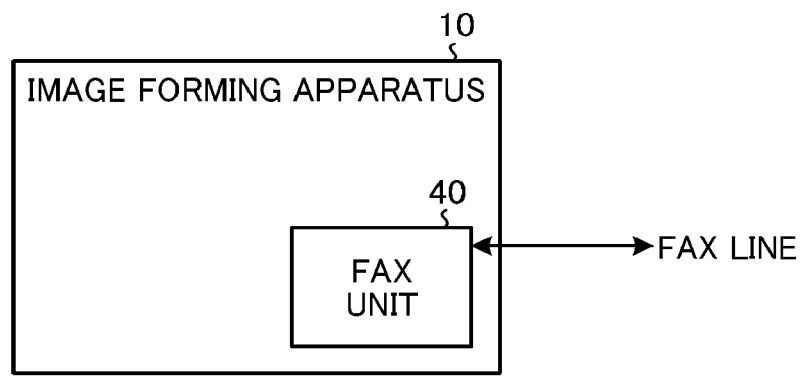
FIG. 1 is a diagram illustrating a schematic general arrangement of an image forming apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

If the existing power saving system for reducing the clock frequency of the CPU is directly applied to an MFP with a facsimile (FAX) function, the MFP may fail to correctly determine an incoming FAX call notice. For example, there is an incoming FAX call determination process of analyzing a ringing component of a calling signal CNG from a FAX transmitter at intervals of a substantially short time (e.g., 20 milliseconds), determining the calling signal CNG as an incoming call when a ringing state is detected three consecutive times, and otherwise determining the calling signal CNG as noise. Herein, ringing refers to distortion of the waveform of the signal. The above-described incoming call determination process is performed to correctly distinguish an incoming call from noise.

However, if the clock frequency of the CPU is reduced based on the threshold of the CPU usage rate or the difference in power level, for example, the above-described incoming call determination process may be completed incorrectly, failing to correctly detect the ringing state. Consequently, the incoming call determination process may fail to correctly distinguish an incoming call from noise, determining an incoming call as noise or vice versa. If the clock frequency of the CPU is controlled based on the threshold of the CPU usage rate or the difference in power level in the execution of a specific function, such as correctly detecting the incoming FAX call, the function may fail to be executed normally.

A technique according to an embodiment of the present invention described below enables normal execution of a specific function by controlling the clock frequency of a control unit such as a CPU.

A communication device, an image forming apparatus, a communication controlling method, and a program according to an embodiment of the present invention will be described in detail below with reference to FIGS. 1 to 9. The communication device may be as a part of the image forming apparatus or an optical device of the image forming apparatus.

A schematic general arrangement of the image forming apparatus according to the embodiment will be described with reference to FIG. 1.

FIG. 1 is a diagram illustrating a schematic general arrangement of the image forming apparatus according to the embodiment. As illustrated in FIG. 1, an image forming apparatus 10 according to the embodiment is an MFP equipped with at least a FAX function. Herein, the MFP is a multifunction peripheral having at least two of a copier function, a printer function, a scanner function, and a FAX function. Specifically, the FAX function of the image forming apparatus 10 is realized by a FAX unit 40, as illustrated in FIG. 1. With the FAX function, the FAX unit 40 transmits and receives data of a document, for example, via a FAX line, which is an analog line or a digital line such as integrated services digital network (ISDN), for example.

A hardware configuration of the image forming apparatus 10 according to the embodiment will be described with reference to FIG. 2.

Figure 2:
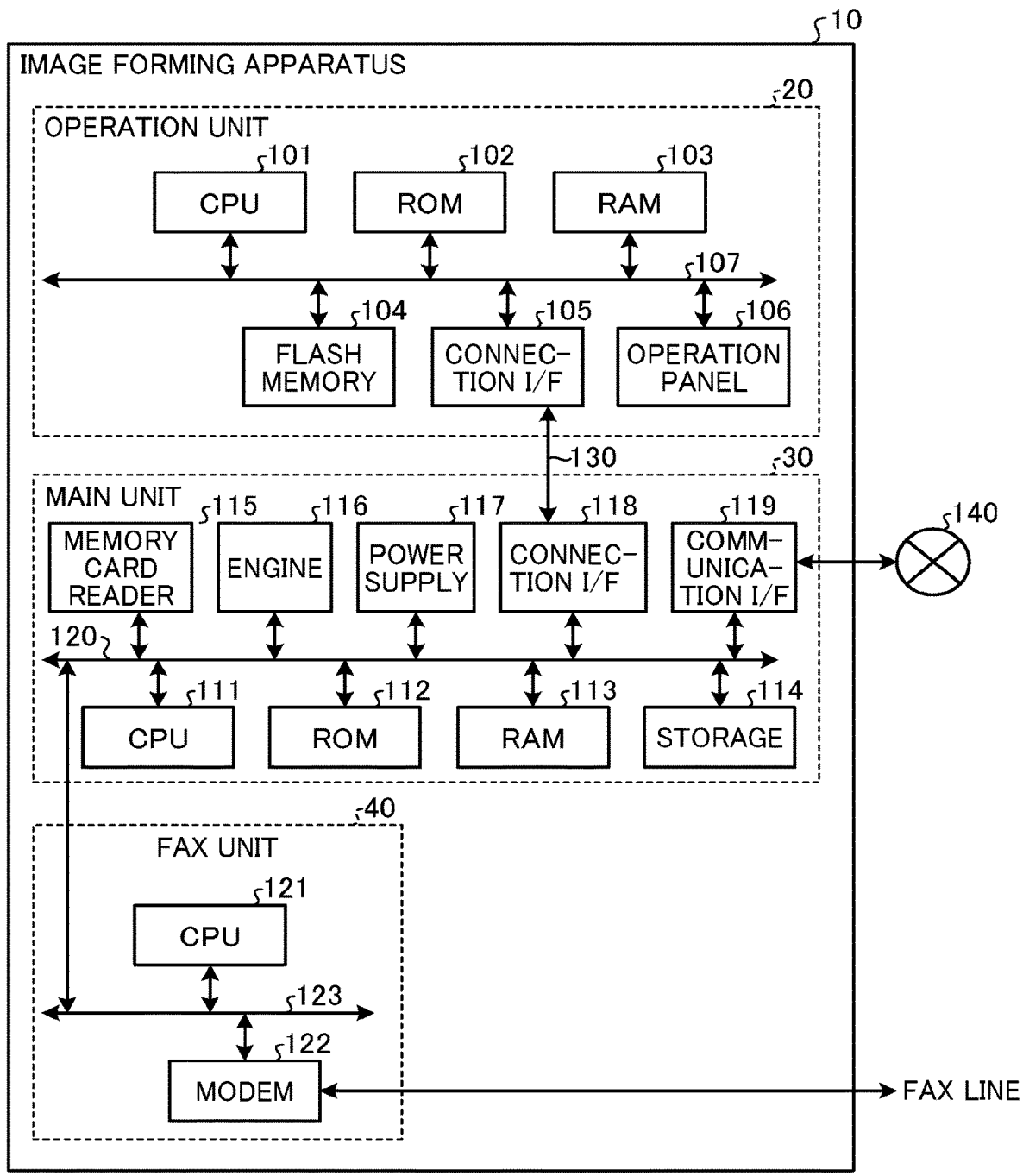
FIG. 2 is a diagram illustrating an example of the hardware configuration of the image forming apparatus according to the embodiment.

FIG. 2 is a diagram illustrating an example of the hardware configuration of the image forming apparatus 10 according to the embodiment. As illustrated in FIG. 2, the image forming apparatus 10 includes, for example, an operation unit 20 that receives an operation performed by a user, a main unit 30 that realizes a variety of image forming functions such as the copier function, the scanner function, and the printer function, and a facsimile unit as an example of the FAX unit 40 that realizes the FAX function. Herein, receiving an operation performed by a user is a concept including receiving information input through the operation performed by the user, such as a signal representing coordinate values in a screen.

The operation unit 20 and the main unit 30 are connected to each other via a dedicated communication line 130 to be communicable with each other. The communication line 130 may conform to the universal series bus (USB) standard, for example. However, the communication line 130 is not limited thereto, and may conform to any wired or wireless standard. Further, the main unit 30 and the FAX unit 40 are directly connected to each other via a bus to be communicable with each other. However, the main unit 30 and the FAX unit are not limited to this type of connection, and may be connected to each other by a dedicated connection interface (I/F). That is, the main unit 30 may be understood as including the FAX unit 40. In the following description of the embodiment, however, it is assumed that the main unit 30 and the FAX unit 40 are separated from each other, as illustrated in FIG. 2 and other drawings, for convenience of description.

The main unit 30 and the FAX unit 40 operate in accordance with an operation received by the operation unit 20. Further, the main unit 30 is capable of communicating with an external apparatus such as a client PC and operating in accordance with an instruction received from the external apparatus.

A hardware configuration of the operation unit 20 will be described.

As illustrated in FIG. 2, the operation unit 20 includes a CPU 101, a read only memory (ROM) 102, a random access memory (RAM) 103, a flash memory 104, a connection I/F 105, an operation panel 106, and a system bus 107.

The CPU 101 performs overall control of the operation of the operation unit 20. The CPU 101 controls the operation of the entire operation unit 20 by executing a program stored in the ROM 102 or the flash memory 104, for example, while using the RAM 103 as a work area. For example, the CPU 101 realizes a variety of functions, such as displaying information (e.g., an image) on the operation panel 106 in accordance with an input received from the user.

The ROM 102 is a nonvolatile memory that stores, for example, a variety of settings and a basic input/output system (BIOS) executed when the operation unit 20 is activated. The RAM 103 is a volatile memory used as the work area of the CPU 101, for example. The flash memory 104 is a nonvolatile memory device that stores, for example, an operating system (OS), an application program, and a variety of data.

The connection I/F 105 is an interface for communicating with the main unit 30 via the communication line 130.

The operation panel 106 is a device with an input function of receiving a variety of inputs according to operations performed by the user and a display function of displaying a variety of information, such as information according to received operations, information of the operating state of the image forming apparatus 10, and information of settings, for example. The operation panel 106 is formed as a liquid crystal display (LCD) equipped with a touch panel function, for example. The operation panel 106 is not limited to the LCD, and may be formed as an organic electro-luminescence (EL) display device equipped with the touch panel function, for example. In addition to or in place of the touch panel function, the operation panel 106 may include an operation unit including hardware keys or a display unit including a lamp, for example.

The system bus 107 is a transmission line that connects the above-described components to transmit therebetween address signals, data signals, and a variety of control signals, for example.

A hardware configuration of the main unit 30 will be described.

As illustrated in FIG. 2, the main unit 30 includes a CPU 111, a ROM 112, a RAM 113, a storage 114, a memory card reader 115, an engine 116, a power supply 117, a connection I/F 118, a communication I/F 119, and a system bus 120.

The CPU 111 performs overall control of the operation of the main unit 30. The CPU 111 controls the operation of the entire main unit 30 by executing a program stored in the ROM 112 or the storage 114, for example, while using the RAM 113 as a work area. For example, the CPU 111 realizes a variety of functions such as the copier function, the scanner function, and the printer function described above. The CPU 111 may be replaced by a control unit called system-on-a-chip (SoC), which is an integrated circuit equipped with a CPU core and functions for controlling peripheral circuits, for example.

The ROM 112 is a nonvolatile memory that stores, for example, a variety of settings and a BIOS executed when the main unit 30 is activated. The RAM 113 is a volatile memory used as the work area of the CPU 111, for example. The storage 114 is a nonvolatile memory device that stores an OS, an application program, and a variety of data, for example. The storage 114 is formed as a hard disk drive (HDD) or a solid state drive (SSD), for example.

The memory card reader 115 is a device that controls data reading, writing, and deletion on a memory card, which is an example of a removable memory medium such as a secure digital (SD) card, a mini SD card, or a micro SD card, for example.

The engine 116 is hardware that performs processing other than general information processing and communication to realize functions such as the copier function, the scanner function, and the printer function. The engine 116 includes, for example, a scanner unit that scans and reads the image of a document and a plotter unit that prints on a sheet material such as a sheet of paper. The engine 116 may also include a specific optional device, such as a finisher that sorts printed sheet materials or an automatic document feeder (ADF) that automatically feeds a document.

The power supply 117 is a device that manages supply of power to devices of the image forming apparatus 10.

The connection I/F 118 is an interface for communicating with the operation unit 20 via the communication line 130. The communication IN 119 is a network interface for connecting the main unit 30 to a network 140, such as a local area network (LAN) or the Internet, to allow the main unit 30 to communicate with an external device connected to the network 140.

The system bus 120 is a transmission line that connects the above-described components to transmit therebetween address signals, data signals, and a variety of control signals, for example.

A hardware configuration of the FAX unit 40 will be described.

As illustrated in FIG. 2, the FAX unit 40 includes a CPU 121, a modem 122, and a system bus 123.

The CPU 121 performs overall control of the operation of the FAX unit 40. The CPU 121 controls the operation of the entire FAX unit 40 by executing a program for the FAX unit 40. The FAX unit 40 may include a ROM and a RAM, for example. In that case, the CPU 121 may execute the program for the FAX unit 40 stored in the ROM by using the RAM as a work area. Further, similarly to the CPU 111, the CPU 121 may be replaced by an SoC as an integrated circuit equipped with a CPU core and functions for controlling peripheral circuits, for example.

The modem 122 is a device connected to the FAX line to detect an incoming call based on ringing of a received incoming call signal and transmit and receive data.

The FAX unit 40 includes the dedicated CPU 121 that executes the operation of the FAX function. However, the FAX unit 40 is not limited to this configuration. For example, the FAX unit 40 may not include the CPU 121, and the CPU 111 included in the main unit 30 may control the operation of the FAX unit 40 based on the FAX function.

Further, the hardware configuration of the operation unit 20, the main unit 30, and the FAX unit 40 illustrated in FIG. 2 is illustrative. Therefore, the operation unit 20, the main unit 30, and the FAX unit 40 are not required to include all of the components illustrated in FIG. 2, and may include other components.

A configuration of functional units of the image forming apparatus 10 according to the embodiment will be described with reference to FIG. 3.

Figure 3:
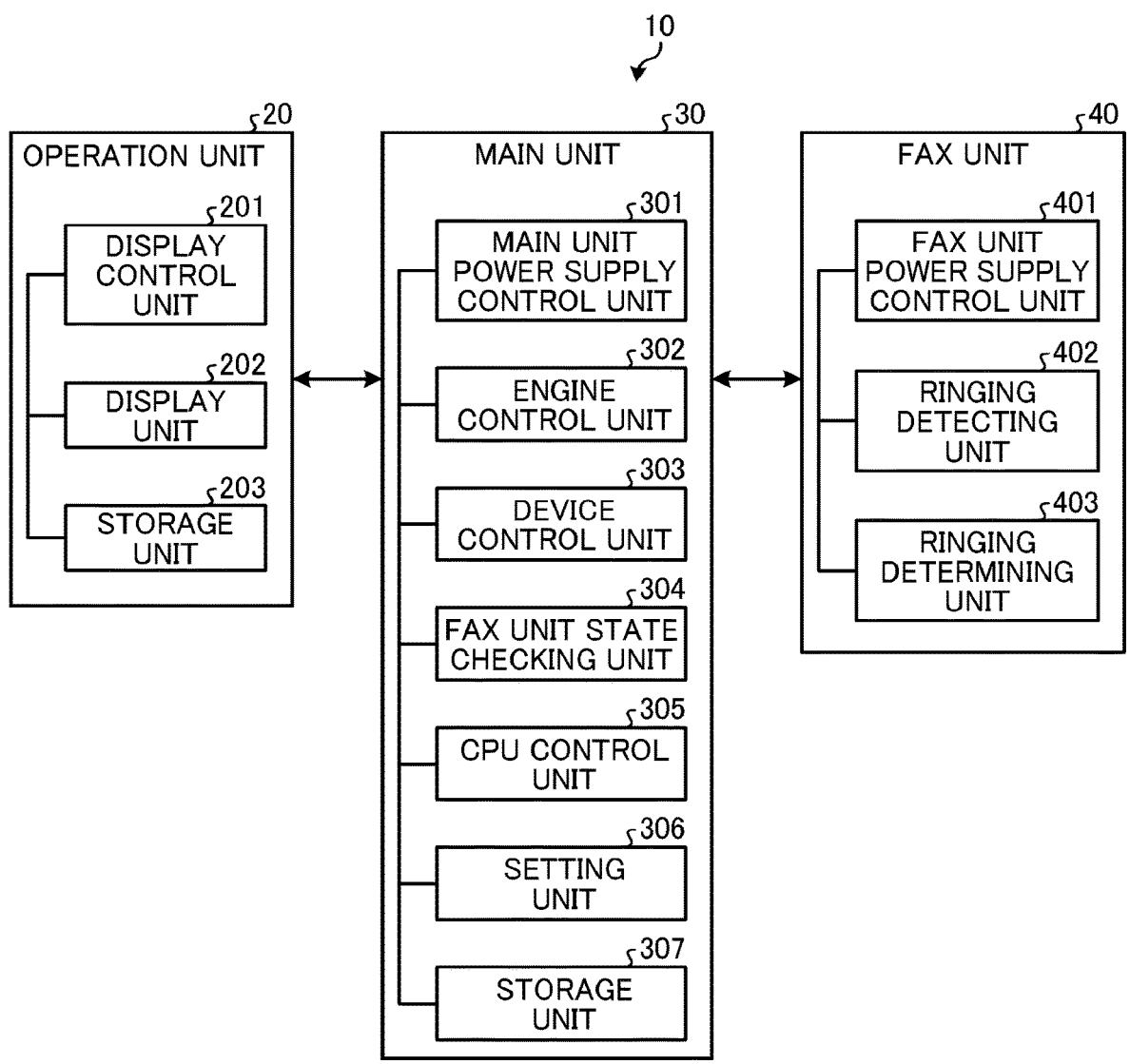
FIG. 3 is a diagram illustrating a configuration example of functional blocks of the image forming apparatus according to the embodiment.

FIG. 3 is a diagram illustrating a configuration example of functional blocks of the image forming apparatus 10 according to the embodiment.

As a configuration of the functional units of the operation unit 20 in the image forming apparatus 10, the operation unit 20 includes a display control unit 201, a display unit 202, and a storage unit 203, as illustrated in FIG. 3.

The display control unit 201 is a functional unit that controls a display operation of the display unit 202. Specifically, the display control unit 201 displays on the display unit 202 a setting screen for setting by a setting unit 306 of the main unit 30 and an operation screen serving as a user interface (UI) for the user. The display control unit 201 is realized by a program (e.g., a driver) executed by the CPU 101 illustrated in FIG. 2, for example.

The display unit 202 is a functional unit that displays a variety of data under the control of the display control unit 201, and is realized by the display function of the operation panel 106 illustrated in FIG. 2.

The storage unit 203 is a functional unit that stores programs and a variety of data, and is realized by the RAM 103 and the flash memory 104 illustrated in FIG. 2, for example.

The display control unit 201, the display unit 202, and the storage unit 203 of the operation unit 20 illustrated in FIG. 3 are conceptual functions, and are not limited to the illustrated configuration. For example, a plurality of functional units of the operation unit 20 illustrated as separated functional units in FIG. 3 may be configured as a single functional unit. Further, the function of a functional unit of the operation unit 20 illustrated in FIG. 3 may be divided into a plurality of functions to configure the functional unit as a plurality of functional units.

Further, the display control unit 201 of the operation unit 20 may be realized not by a software program but by a hardware circuit, such as a field-programmable gate array (FPGA) or an application specific integrated circuit (ASIC).

As a configuration of the functional units of the main unit 30 in the image forming apparatus 10, the main unit 30 includes a main unit power supply control unit 301, an engine control unit 302, a device control unit 303, a FAX unit state checking unit 304, a CPU control unit 305, a setting unit 306, and a storage unit 307, as illustrated in FIG. 3. The main unit power supply control unit 301 is an example of a first power supply control unit. The FAX unit state checking unit 304 is an example of a first determining unit. The CPU control unit 305 is an example of a control unit.

The main unit power supply control unit 301 is a functional unit that manages the power supply to devices of the image forming apparatus 10 by the power supply 117, to thereby control the operating state of the image forming apparatus 10. In the present embodiment, whether the operating state of the image forming apparatus 10 is the power saving state will be discussed. Hereinafter, the state in which the image forming apparatus operates in power saving mode may be referred to as the power saving state. The main unit power supply control unit 301 is realized by a program executed by the CPU 111 illustrated in FIG. 2, for example.

The engine control unit 302 is a functional unit that performs power control of the engine 116 in accordance with a command from the main unit power supply control unit 301. The engine control unit 302 is realized by the program executed by the CPU 111 illustrated in FIG. 2, for example.

The device control unit 303 is a functional unit that performs power control of devices such as the memory card reader 115 in accordance with a command from the main unit power supply control unit 301. The device control unit 303 is realized by the program executed by the CPU 111 illustrated in FIG. 2, for example.

The FAX unit state checking unit 304 is a functional unit that checks whether the power supply of the FAX unit 40 is turned on. The FAX unit state checking unit 304 notifies the main unit power supply control unit 301 of the checked state of the power supply of the FAX unit 40. The FAX unit state checking unit 304 is realized by the program executed by the CPU 111 illustrated in FIG. 2, for example.

The CPU control unit 305 is a functional unit that calculates the usage rates of the CPUs 111 and 121 and controls increase or reduction in the clock frequencies of the CPUs 111 and 121 in accordance with a command from the main unit power supply control unit 301. The CPU control unit 305 is realized by the program executed by the CPU 111 illustrated in FIG. 2, for example.

The usage rate calculation and the increase or reduction of the clock frequency by the CPU control unit 305 are not limited to the CPUs 111 and 121, and may also apply to the CPU 101 of the operation unit 20 or control units such as SoCs having functions corresponding to these CPUs, for example. In the following description, a CPU subjected to the usage rate calculation and the increase or reduction of the clock frequency by the CPU control unit 305 may be simply referred to as the CPU.

The setting unit 306 is a functional unit that sets a variety of information specifying the operation of the image forming apparatus 10. For example, the setting unit 306 performs setting as to whether to allow transition of the power saving state to the low-clock engine off state, as described in detail later with reference to FIG. 6. The setting unit 306 is realized by the program executed by the CPU 111 illustrated in FIG. 2, for example.

The storage unit 307 is a functional unit that stores a variety of information used by the image forming apparatus 10. The storage unit 307 stores information of settings made by the setting unit 306, for example. The storage unit 307 is realized by at least one of the RAM 113 and the storage 114 illustrated in FIG. 2.

The main unit power supply control unit 301, the engine control unit 302, the device control unit 303, the FAX unit state checking unit 304, the CPU control unit 305, the setting unit 306, and the storage unit 307 of the main unit 30 illustrated in FIG. 3 are conceptual functions, and are not limited to the illustrated configuration. For example, a plurality of functional units of the main unit 30 illustrated as separate functional units in FIG. 3 may be configured as a single functional unit. Further, the function of a functional unit of the main unit 30 illustrated in FIG. 3 may be divided into a plurality of functions to configure the functional unit as a plurality of functional units.

Further, the main unit power supply control unit 301, the engine control unit 302, the device control unit 303, the FAX unit state checking unit 304, the CPU control unit 305, and the setting unit 306 of the main unit 30 may be realized not by a software program but by a hardware circuit, such as an FPGA or an ASIC.

As a configuration of the functional units of the FAX unit 40 in the image forming apparatus 10, the FAX unit 40 includes a FAX unit power supply control unit 401, a ringing detecting unit 402, and a ringing determining unit 403, as illustrated in FIG. 3. The FAX unit power supply control unit 401 is an example of a second power supply control unit. The ringing detecting unit 402 is an example of a detecting unit. The ringing determining unit 403 is an example of a second determining unit.

The FAX unit power supply control unit 401 is a functional unit that performs power control of the FAX unit 40, and is realized by a program executed by the CPU 121 illustrated in FIG. 2, for example.

The ringing detecting unit 402 is a functional unit that detects whether the ringing of the incoming call signal (e.g., the calling signal CNG) has been received by the modem 122 of the FAX unit 40 regardless of whether the power supply of the FAX unit 40 is on or off. The ringing detecting unit 402 transmits the detected ringing to the FAX unit power supply control unit 401. The ringing detecting unit 402 is realized by the program executed by the CPU 121 illustrated in FIG. 2, for example.

The ringing determining unit 403 is a functional unit that determines whether the ringing detected by the ringing detecting unit 402 represents an incoming call based on the FAX function or noise. If having determined that the ringing represents an incoming call, the ringing determining unit 403 transmits a return request to the main unit 30 to return the image forming apparatus 10 from the power saving state. The ringing determining unit 403 is realized by the program executed by the CPU 121 illustrated in FIG. 2, for example.

The FAX unit power supply control unit 401, the ringing detecting unit 402, and the ringing determining unit 403 of the FAX unit 40 illustrated in FIG. 3 are conceptual functions, and are not limited to the illustrated configuration. For example, a plurality of functional units of the FAX unit 40 illustrated as separate functional units in FIG. 3 may be configured as a single functional unit. Further, the function of a functional unit of the FAX unit 40 illustrated in FIG. 3 may be divided into a plurality of functions to configure the functional unit as a plurality of functional units.

Further, the FAX unit power supply control unit 401, the ringing detecting unit 402, and the ringing determining unit 403 of the FAX unit 40 may be realized not by a software program but by a hardware circuit, such as an SoC, an FPGA, or an ASIC.

The transition of the power saving state of the image forming apparatus 10 according to the embodiment will be described with reference to FIG. 4.

Figure 4:
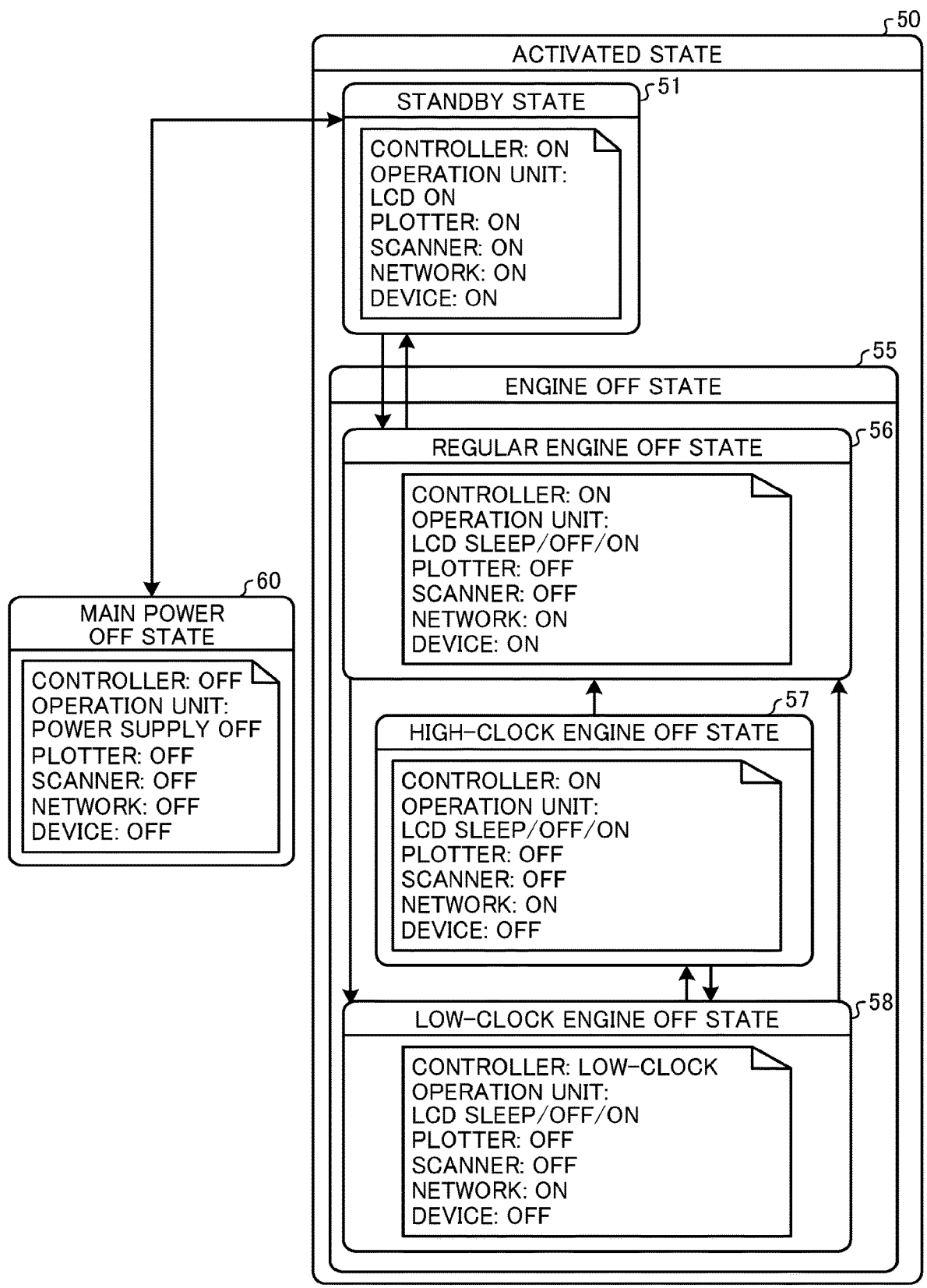
FIG. 4 is a diagram illustrating an example of transition of a power saving state of the image forming apparatus according to the embodiment.

FIG. 4 is a diagram illustrating an example of the transition of the power saving state of the image forming apparatus 10 according to the embodiment. In FIG. 4, respective power saving states are assigned with reference numerals for convenience of description.

As illustrated in FIG. 4, operating states taken on by the image forming apparatus 10 according to the embodiment as power saving states include an activated state 50 and a main power off state 60.

The activated state 50 is an operating state in which at least the CPU is operating, and at least one of the above-described units is ready to operate. The main power off state 60 is an operating state in which the operation of the CPU is stopped, and none of the above-described units is ready to operate. In the main power off state 60, it is possible to pull out a power plug safely. In the main power off state 60, power consumption is lower than in the other operating states. To use the units in the main power off state 60, however, it takes a few minutes before the units become ready to be activated after a main power button is pressed.

Further, as illustrated in FIG. 4, the activated state 50 as one of the power saving states of the image forming apparatus 10 includes a standby state 51 and an engine off state 55. The standby state 51 is an example of a first power state, and the engine off state 55 is an example of a second power state.

The standby state 51 is an operating state in which the respective units (i.e., devices) of the image forming apparatus 10 are activated, and the power consumption is higher than in the other operating states. That is, all functions of the image forming apparatus 10 are usable in the standby state 51. In the example illustrated in FIG. 4, when the power saving state of the image forming apparatus 10 is the standby state 51, the CPU (or a controller equipped with the CPU or the SoC, for example) is operating, and the LCD of the operation panel 106 of the operation unit 20 is on. Further, when the power saving state of the image forming apparatus 10 is the standby state 51, the power supply of the engine 116 (e.g., the scanner unit and the plotter unit) is on, the communication function of the communication I/F 119 is enabled, and the power supply of the devices (e.g., the memory card reader 115) is on. As illustrated in FIG. 4, the image forming apparatus 10 transitions between the standby state 51 and the main power off state 60 when a predetermined condition is met, such as when a predetermined operation is performed on the operation panel 106 by the user.

As illustrated in FIG. 4, the image forming apparatus 10 transitions between the standby state 51 and the engine off state 55 when a predetermined condition is met, such as when a predetermined operation is performed on the operation panel 106 by the user, or when a condition related to timer setting or the state of the image forming apparatus 10 is met.

The engine off state 55 is an operating state in which the power supply of the engine 116 (e.g., the scanner unit and the plotter unit) is off, and the CPU (or the controller) is operating and thus executing the program. Further, as illustrated in FIG. 4, the engine off state 55 as one of the power saving states of the image forming apparatus 10 includes a regular engine off state 56, a high-clock engine off state 57, and a low-clock engine off state 58.

The regular engine off state 56 is an operating state in which the power supply of the engine 116 (e.g., the scanner unit and the plotter unit) is off, and the power supply of the devices (e.g., the memory card reader 115) is on. When the power saving state of the image forming apparatus 10 transitions from the engine off state 55 to the standby state 51, the image forming apparatus 10 is in the regular engine off state 56 as the power saving state. That is, as illustrated in FIG. 4, the image forming apparatus 10 transitions between the regular engine off state 56 and the standby state 51 when a predetermined condition is met, such as when a predetermined operation is performed on the operation panel 106 by the user, or when a condition related to timer setting or the state of the image forming apparatus 10 is met. In the example illustrated in FIG. 4, when the power saving state of the image forming apparatus 10 is the regular engine off state 56, the CPU (or the controller) is operating, and the LCD of the operation panel 106 of the operation unit 20 is on when in use and off or in a sleep state when not in use. Further, in the regular engine off state 56, the power supply of the engine 116 (e.g., the scanner unit and the plotter unit) is off, the communication function of the communication I/F 119 is enabled, and the power supply of the devices (e.g., the memory card reader 115) is on.

The high-clock engine off state 57 is an operating state in which, when the image forming apparatus 10 in the low-clock engine off state 58 does not operate normally or has or may have a trouble due to slowdown of processing, for example, the CPU control unit 305 temporarily increases the clock frequency of the CPU to restore normal operation. In the example illustrated in FIG. 4, when the power saving state of the image forming apparatus 10 is the high-clock engine off state 57, the CPU (or the controller) is operating at a clock frequency higher than that in the low-clock engine off state 58, and the LCD of the operation panel 106 of the operation unit 20 is on when in use and off or in a sleep state when not in use. Further, in the high-clock engine off state 57, the power supply of the engine 116 (e.g., the scanner unit and the plotter unit) is off, the communication function of the communication I/F 119 is enabled, and the power supply of the devices (e.g., the memory card reader 115) is off.

For example, when the image forming apparatus 10 is accessed by an external device in the low-clock engine off state 58 in which the clock frequency of the CPU is reduced, the usage rate of the CPU is increased, increasing the time for the access process. When the usage rate of the CPU exceeds a predetermined value in this case, the image forming apparatus 10 is temporarily transitioned from the low-clock engine off state 58 to the high-clock engine off state 57. This transition operation of the image forming apparatus 10 will be described later with reference to FIG. 8.

Further, when the ringing is detected in the low-clock engine off state 58 of the image forming apparatus 10, in which the clock frequency of the CPU is reduced, the determination of whether the ringing represents an incoming call or noise may fail to be correctly made owing to the low clock frequency of the CPU and thus an elongated processing time. In this case, the image forming apparatus 10 is temporarily transitioned from the low-clock engine off state 58 to the high-clock engine off state 57. This transition operation of the image forming apparatus 10 will be described later with reference to FIGS. 7A and 71B.

The power consumption is higher in the high-clock engine off state 57 than in the low-clock engine off state 58. Therefore, it is desirable to return the image forming apparatus 10 to the low-clock engine off state 58 when the condition for transitioning the image forming apparatus 10 to the low-clock engine off state 58 is met. Thus, the high-clock engine off state 57 is not a steady operating state but a temporary operating state.

The low-clock engine off state 58 is an operating state in which the clock frequency of the CPU is reduced and the unnecessary power supply of the devices is turned off to reduce the power consumption as compared with in the regular engine off state 56. That is, in the low-clock engine off state 58, the clock frequency of the CPU is reduced, increasing the time for the processes of the image forming apparatus 10 and facilitating the increase in the usage rate of the CPU. In the low-clock engine off state 58, therefore, the power supply of the devices (e.g., the memory card reader 115) is also turned off, preventing access to the memory card such as the micro SD card. In the example illustrated in FIG. 4, when the power saving state of the image forming apparatus 10 is the low-clock engine off state 58, the CPU (or the controller) is operating at a clock frequency lower than those in the regular engine off state 56 and the high-clock engine off state 57, and the LCD of the operation panel 106 of the operation unit 20 is on when in use and off or in a sleep state when not in use. Further, in the low-clock engine off state 58, the power supply of the engine 116 (e.g., the scanner unit and the plotter unit) is off, the communication function of the communication I/F 119 is enabled, and the power supply of the devices (e.g., the memory card reader 115) is off. Herein, the above-described controller is, for example, a unit such as an electronic circuit board integrating the CPU 111, the ROM 112, the RAM 113, the storage 114, the memory card reader 115, the connection I/F 118, and the communication I/F 119 of the main unit 30 in FIG. 2.

As illustrated in FIG. 4, the image forming apparatus 10 transitions between the regular engine off state 56 and the low-clock engine off state 58 when a predetermined condition is met. Further, the image forming apparatus 10 transitions between the high-clock engine off state 57 and the low-clock engine off state 58 when a predetermined condition is met. Further, the image forming apparatus 10 transitions from the high-clock engine off state 57 to the regular engine off state 56 when a predetermined condition is met. Specific examples of these transition operations between the regular engine off state 56, the high-clock engine off state 57, and the low-clock engine off state 58 will be described in detail below with reference to FIGS. 5 to 9.

The image forming apparatus 10 is assumed to take on one of the power saving states illustrated in FIG. 4, i.e., the main power off state 60, the standby state 51, the regular engine off state 56, the high-clock engine off state 57, and the low-clock engine off state 58, and not to simultaneously take on two or more of these power saving states.

Further, the power saving states illustrated in FIG. 4 are illustrative of the operating states of the image forming apparatus 10, and the image forming apparatus 10 is not limited to these operating states.

Figure 5:
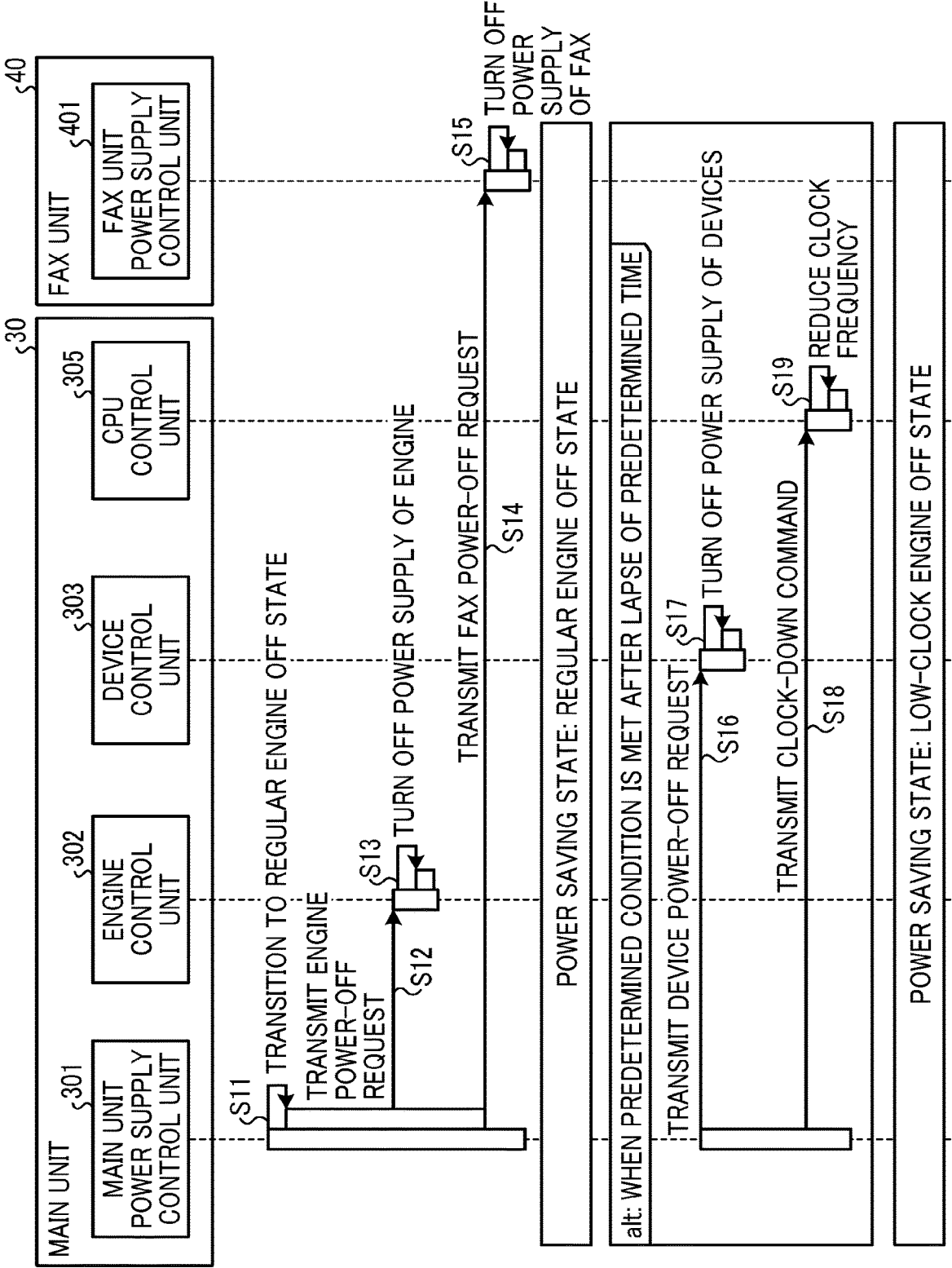
FIG. 5 is a sequence diagram illustrating an example of an operation in which the image forming apparatus according to the embodiment transitions to a low-clock engine off state.

With reference to FIGS. 5 and 6, a description will be given of an example of the transition operation in which the image forming apparatus 10 of the embodiment transitions from the regular engine off state 56 to the low-clock engine off state 58.

FIG. 5 is a sequence diagram illustrating an example of the operation in which the image forming apparatus 10 of the embodiment transitions to the low-clock engine off state 58. FIG. 6 is a diagram illustrating an example of a screen for setting as to whether to allow the transition of the image forming apparatus 10 of the embodiment to the low-clock engine off state 58.

When a predetermined condition is met, the main unit power supply control unit 301 of the main unit 30 transitions the power saving state of the image forming apparatus 10 to the regular engine off state 56 (step S11).

After the transition to the regular engine off state 56, the main unit power supply control unit 301 transmits an engine power-off request to the engine control unit 302 to turn off the power supply of the engine 116 (e.g., the plotter unit and the scanner unit) (step S12).

In response to the engine power-off request from the main unit power supply control unit 301, the engine control unit 302 turns off the power supply of the engine 116 (step S13).

After the transition to the regular engine off state 56, the main unit power supply control unit 301 transmits a FAX power-off request to the FAX unit power supply control unit 401 of the FAX unit 40 to turn off the power supply of the FAX unit 40 (step S14).

In response to the FAX power-off request from the main unit power supply control unit 301, the FAX unit power supply control unit 401 turns off the power supply of the FAX unit 40 (step S15).

When a predetermined condition is met after the lapse of a predetermined time (e.g., five seconds) since the transition of the power saving state of the image forming apparatus 10 to the regular engine off state 56, the main unit power supply control unit 301 transitions the power saving state of the image forming apparatus 10 to the low-clock engine off state 58. Herein, the predetermined condition is when the memory card reader 115 is not accessing the memory card and the power supply of the operation unit 20 and the power supply of the FAX unit 40 are off, for example. For instance, when the memory card reader 115 is performing a process of accessing the memory card, it is not desirable to transition the image forming apparatus 10 to the low-clock engine off state 58, in which the access process may slow down. Further, when the power supply of the FAX unit 40 is on, it is desirable not to transition the image forming apparatus 10 to the low-clock engine off state 58 to correctly determine whether the ringing represents an incoming call.

The above-described predetermined condition may also include when a setting allowing the transition of the image forming apparatus 10 to the low-clock engine off state 58 is made by the setting unit 306 on the setting screen displayed on the operation panel 106 of the operation unit 20 as illustrated in FIG. 6, for example. FIG. 6 illustrates an example of the setting screen, in which the setting allowing the transition to the low-clock engine off state 58 is selected. In the low-clock engine off state 58, the clock frequency of the CPU is reduced, reducing the power consumption, but at the same time slowing down the processes of the image forming apparatus 10 as compared with those in the regular engine off state 56, for example. For possible users who prefer to avoid such a situation, therefore, a setting screen such as that illustrated in FIG. 6 may be provided to allow the users to perform the setting as to whether to allow the transition to the low-clock engine off state 58. In the transition process from the regular engine off state 56 to the low-clock engine off state 58, the main unit power supply control unit 301 may refer to the information of settings made by the setting unit 306 on the setting screen illustrated in FIG. 6. Then, if a setting disallowing the transition is made, the main unit power supply control unit 301 may maintain the image forming apparatus 10 in the regular engine off state 56.

Then, after the transition to the low-clock engine off state 58, the main unit power supply control unit 301 transmits a device power-off request to the device control unit 303 to turn off the power supply of the devices (e.g., the memory card reader 115) (step S16).

In response to the device power-off request from the main unit power supply control unit 301, the device control unit 303 turns off the power supply of the devices (step S17).

After the transition to the low-clock engine off state 58, the main unit power supply control unit 301 transmits a clock-down command to the CPU control unit 305 to reduce the clock frequency of the CPU (step S18).

In response to the clock-down command from the main unit power supply control unit 301, the CPU control unit 305 reduces the clock frequency of the CPU (step S19). Herein, methods of reducing of the clock frequency of the CPU include reducing the clock frequency by a predetermined value to a clock frequency equal to or greater than a predetermined minimum value, and reducing the clock frequency by a predetermined ratio to the current clock frequency, for example. For instance, the CPU control unit 305 reduces each of the clock frequencies of the CPUs 111 and 121 from 800 megahertz (MHz) to 20 MHz. These clock frequencies are illustrative, and may be changed as appropriate in accordance with the specifications of an employed system. Further, the clock frequency of the CPU 111 and the clock frequency of the CPU 121 may be individually changed.

With steps S11 to S19 described above, the image forming apparatus 10 transitions from the regular engine off state 56 to the low-clock engine off state 58.

With reference to FIGS. 7A and 71B, a description will be given of an example of the transition operation in which the image forming apparatus 10 of the embodiment transitions from the low-clock engine off state 58 to the high-clock engine off state 57 to determine whether the ringing represents an incoming call.

FIGS. 7A and 71B are a sequence diagram illustrating an example of the operation in which the image forming apparatus 10 of the embodiment transitions from the low-clock engine off state 58 to the high-clock engine off state 57 in response to the incoming call signal.

It is assumed here that the image forming apparatus 10 is in the low-clock engine off state 58. If the ringing detecting unit 402 of the FAX unit 40 detects the receipt of the incoming call signal via the FAX line in the low-clock engine off state 58, the ringing detecting unit 402 transmits the incoming call signal to the FAX unit power supply control unit 401 (step S31). The incoming call signal is an example of an input signal to be detected, and may be a calling signal CNG having a frequency of 1100 Hz, for example.

In response to the incoming call signal from the ringing detecting unit 402, the FAX unit power supply control unit 401 turns on the power supply of the FAX unit 40 (step S32).

After turning on the power supply of the FAX unit 40, the FAX unit power supply control unit 401 transmits the received incoming call signal to the ringing determining unit 403 (step S33).

The ringing determining unit 403 executes incoming call determination of determining whether the received incoming call signal represents an incoming call or noise (step S34). The incoming call determination is an example of a specific function related to communication. In this case, the power supply of the FAX unit 40 is on, and the clock frequencies of the CPUs 111 and 121 are increased at step S40 described later. The incoming call determination is therefore executed with the clock frequencies of the CPUs 111 and 121 increased. That is, the incoming call determination on the incoming call signal at steps S31 to S34 in FIGS. 7A and 71B and a later-described process of increasing the clock frequencies of the CPUs 111 and 121 at steps S35 to S40 in FIGS. 7A and 71B are executed in parallel, although the process of increasing the clock frequencies of the CPUs 111 and 121 at steps S35 to S40 is illustrated after the incoming call determination at steps S31 to S34 in the sequence of FIGS. 7A and 71B for convenience of illustration. In the present embodiment, each of the clock frequencies of the two CPUs 111 and 121 is increased as the process of increasing the clock frequency of the CPU, as described above. In the following, increasing (or reducing) each of the clock frequencies of the CPUs 111 and 121 may be simply described as "increasing (or reducing) the clock frequency of the CPU." Alternatively, the clock frequency of the CPU 111 and the clock frequency of the CPU 121 may be individually controlled to change (i.e., increase) the clock frequency of one of the CPUs 111 and 121, which is desired to be changed (i.e., increased).

The above-described processes of steps S31 to S34 are executed each time the ringing detecting unit 402 detects the receipt of the incoming call signal. If the power supply of the FAX unit 40 is already on, however, the process of step S32 is skipped.

When the image forming apparatus 10 is in the low-clock engine off state 58, the main unit power supply control unit 301 transmits a FAX state check request to the FAX unit state checking unit 304 at intervals of a predetermined time (e.g., every second) to check the state of the power supply of the FAX unit 40 (step S35).

The FAX unit state checking unit 304 transmits the FAX state check request received from the main unit power supply control unit 301 to the FAX unit power supply control unit 401 of the FAX unit 40 (step S36).

In response to the FAX state check request, the FAX unit power supply control unit 401 checks whether the power supply of the FAX unit 40 is on or off, and transmits FAX state information including the check result to the FAX unit state checking unit 304 of the main unit 30 (step S37).

The FAX unit state checking unit 304 transmits the FAX state information received from the FAX unit power supply control unit 401 to the main unit power supply control unit 301 (step S38).

If the FAX state information received from the FAX unit state checking unit 304 indicates that the power supply of the FAX unit 40 is on, the main unit power supply control unit 301 transmits a clock-up command to the CPU control unit 305 to increase the clock frequency of the CPU (step S39).

In response to the clock-up command from the main unit power supply control unit 301, the CPU control unit 305 increases the clock frequency of the CPU (step S40). Herein, the methods of increasing the clock frequency of the CPU include, for example, increasing the clock frequency by a predetermined value, increasing the clock frequency by a predetermined ratio to the current clock frequency, and increasing the clock frequency based on the difference or ratio between the frequency of the received incoming call signal and the clock frequency. When the power supply of the FAX unit 40 is turned on and the clock frequency of the CPU is increased, as described above, the power saving state of the image forming apparatus 10 transitions from the low-clock engine off state 58 to the high-clock engine off state 57. For instance, the CPU control unit 305 increases each of the clock frequencies of the CPUs 111 and 121 to 800 MHz from 20 MHz. These clock frequencies are illustrative, and may be changed as appropriate in accordance with the specifications of the employed system. Further, the clock frequency of the CPU 111 and the clock frequency of the CPU 121 may be individually changed, as described above. When increasing the clock frequency, the main unit power supply control unit 301 transitions the image forming apparatus 10 from the low-clock engine off state 58 to the high-clock engine off state 57, as described above. At this stage, however, the main unit power supply control unit 301 maintains the image forming apparatus 10 in the engine off state 55, without transitioning the image forming apparatus 10 to the standby state 51, as illustrated in FIG. 4.

When the image forming apparatus 10 is in the low-clock engine off state 58, the above-described processes of steps S35 to S40 are repeated at intervals of a predetermined time (e.g., every second).

When the image forming apparatus 10 transitions to the high-clock engine off state 57, and if it is determined from the above-described incoming call determination by the ringing determining unit 403 at step S34 that the incoming call signal represents an incoming call, the image forming apparatus 10 transitions (i.e., returns) to the standby state 51 to perform a FAX receiving process based on the FAX function of the FAX unit 40 (step S41). This operation of transitioning to the standby state 51 will be described in detail later with reference to another sequence illustrated in FIG. 9.

When the image forming apparatus 10 transitions to the high-clock engine off state 57, and if it is determined from the above-described incoming call determination by the ringing determining unit 403 at step S34 that the incoming call signal represents noise, the ringing determining unit 403 transmits a determination result indicating that the incoming call signal represents noise to the FAX unit power supply control unit 401 (step S42).

If the FAX unit power supply control unit 401 determines that the ringing state has ended based on the determination result from the ringing determining unit 403 indicating that the incoming call signal represents noise, for example, the FAX unit power supply control unit 401 turns off the power supply of the FAX unit 40 (step S43).

After the lapse of a predetermined time (e.g., five seconds) since the transition of the image forming apparatus 10 to the high-clock engine off state 57, the main unit power supply control unit 301 transmits the FAX state check request to the FAX unit state checking unit 304 at intervals of a predetermined time (e.g., every second) to check the state of the power supply of the FAX unit 40 (step S44).

The FAX unit state checking unit 304 transmits the FAX state check request received from the main unit power supply control unit 301 to the FAX unit power supply control unit 401 of the FAX unit 40 (step S45).

In response to the FAX state check request, the FAX unit power supply control unit 401 checks whether the power supply of the FAX unit 40 is on or off, and transmits the FAX state information including the check result to the FAX unit state checking unit 304 of the main unit 30 (step S46).

The FAX unit state checking unit 304 transmits the FAX state information received from the FAX unit power supply control unit 401 to the main unit power supply control unit 301 (step S47).

If the FAX state information received from the FAX unit state checking unit 304 indicates that the power supply of the FAX unit 40 is off, the main unit power supply control unit 301 transmits the clock-down command to the CPU control unit 305 to reduce the clock frequency of the CPU (step S48).

In response to the clock-down command from the main unit power supply control unit 301, the CPU control unit 305 reduces the clock frequency of the CPU (step S49). When the power supply of the FAX unit 40 is turned off and the clock frequency of the CPU is reduced, as described above, the power saving state of the image forming apparatus 10 transitions from the high-clock engine off state 57 to the low-clock engine off state 58.

When the image forming apparatus 10 is in the high-clock engine off state 57, the above-described processes of steps S44 to S49 are repeated at intervals of a predetermined time (e.g., every second).

With steps S31 to S49 described above, the image forming apparatus 10 transitions from the low-clock engine off state 58 to the high-clock engine off state 57 to perform the incoming call determination.

As described above, when the receipt of the incoming call signal is detected in the low-clock engine off state 58 of the image forming apparatus 10, the power supply of the FAX unit 40 is turned on, and the clock frequency of the CPU is increased to transition the image forming apparatus 10 to the high-clock engine off state 57. Even if the incoming call signal is received in the low-clock engine off state 58, therefore, the increased clock frequency of the CPU enables normal execution of a incoming call determination function of determining whether the incoming call signal represents an incoming call or noise.

With reference to FIG. 8, a description will be given of an example of the transition operation in which the image forming apparatus 10 of the embodiment transitions from the low-clock engine off state 58 to the high-clock engine off state 57 to normally execute the incoming call determination, which is an example of the specific function.

FIG. 8 is a sequence diagram illustrating an example of the operation in which the image forming apparatus 10 of the embodiment transitions from the low-clock engine off state 58 to the high-clock engine off state 57 based on the usage rate of the CPU. Herein, the image forming apparatus 10 is assumed to be in the low-clock engine off state 58. When the image forming apparatus 10 is in the low-clock engine off state 58, the CPU control unit 305 (i.e., an example of the control unit) of the main unit 30 checks (i.e., calculates) the usage rate of the CPU (step S51).

If the usage rate of the CPU calculated by the CPU control unit 305 continues to be equal to or greater than a first threshold having a predetermined value (e.g., 90%) for a predetermined time (e.g., three seconds), the CPU control unit 305 increases the clock frequency of the CPU by employing one of the above-mentioned exemplary methods (step S52). With the clock frequency of the CPU thus increased, the power saving state of the image forming apparatus 10 transitions from the low-clock engine off state 58 to the high-clock engine off state 57.

The thus temporarily increased clock frequency of the CPU increases the throughput of the CPU. Therefore, the incoming call determination as a factor increasing the usage rate of the CPU is normally executed, and the usage rate of the CPU is reduced.

The CPU control unit 305 notifies the main unit power supply control unit 301 of the increase in the clock frequency of the CPU (step S53).

If a predetermined condition is met after the lapse of a predetermined time (e.g., five seconds) since the transition of the power saving state of the image forming apparatus 10 to the high-clock engine off state 57, the main unit power supply control unit 301 transmits the clock-down command to the CPU control unit 305 to reduce the clock frequency of the CPU (step S54). Herein, the predetermined condition includes, for example, when the usage rate of the CPU is reduced to or below a second threshold having a predetermined value (e.g., 50%) owing to normal execution of the incoming call determination as a factor increasing the usage rate of the CPU.

In response to the clock-down command from the main unit power supply control unit 301, the CPU control unit 305 reduces the clock frequency of the CPU (step S55). With the clock frequency of the CPU thus reduced, the power saving state of the image forming apparatus 10 transitions from the high-clock engine off state 57 to the low-clock engine off state 58.

With steps S51 to S55 described above, the image forming apparatus 10 transitions from the low-clock engine off state 58 to the high-clock engine off state 57 to normally execute the incoming call determination.

As described above, if the usage rate of the CPU continues to be equal to or greater than a predetermined value for a predetermined time in the low-clock engine off state 58 of the image forming apparatus 10, the clock frequency of the CPU is increased to transition the image forming apparatus 10 to the high-clock engine off state 57. Thereby, the throughput of the CPU is increased, enabling normal execution of the incoming call determination and a reduction in the usage rate of the CPU.

With reference to FIG. 9, a description will be given of an example of the transition operation in which the image forming apparatus 10 of the embodiment transitions from the low-clock engine off state 58 to the standby state 51.

FIG. 9 is a sequence diagram illustrating an example of the operation in which the image forming apparatus 10 of the embodiment transitions from the low-clock engine off state 58 to the standby state 51. The image forming apparatus 10 is assumed to be in the low-clock engine off state 58 at the beginning of the sequence in FIG. 9.

It is assumed here that a user 70 performs an input operation on the operation panel 106 of the operation unit 20 as a condition for returning the image forming apparatus 10 to the standby state 51 (step S71).

If the operation unit 20 is in the sleep state, for example, the input operation performed on the operation panel 106 of the operation unit 20 by the user 70 brings the operation unit 20 back to the operable state. Then, the display control unit 201 of the operation unit 20 detects the input operation performed by the user 70, and transmits a return request to the main unit power supply control unit 301 of the main unit 30 to return the power saving state of the image forming apparatus 10 to the standby state 51 from the low-clock engine off state 58 (step S72). In the present example, the display control unit 201 detects the input operation. However, the configuration is not limited thereto, and a control unit dedicated to operations may detect the input operation.

Alternatively, if it is determined in the incoming call determination by the ringing determining unit 403 at step S34 in FIG. 7B that the incoming call signal represents an incoming call as a condition for returning the image forming apparatus 10 to the standby state 51 (step S73), the ringing determining unit 403 transmits the return request to the main unit power supply control unit 301 of the main unit 30 to return the power saving state of the image forming apparatus 10 to the standby state 51 from the low-clock engine off state 58 (step S74).

In response to the return request from the operation unit 20 or the FAX unit 40, the main unit power supply control unit 301 of the main unit 30 transmits the clock-up command to the CPU control unit 305 to increase the clock frequency of the CPU (step S75).

In response to the clock-up command from the main unit power supply control unit 301, the CPU control unit 305 increases the clock frequency of the CPU by employing one of the above-mentioned exemplary methods (step S76).

Further, in response to the return request from the operation unit 20 or the FAX unit 40, the main unit power supply control unit 301 transmits a device power-on request to the device control unit 303 to turn on the power supply of the devices (e.g., the memory card reader 115) (step S77).

In response to the device power-on request from the main unit power supply control unit 301, the device control unit 303 turns on the power supply of the devices (step S78). When the clock frequency of the CPU is increased and the power supply of the devices is turned on, as described above, the power saving state of the image forming apparatus 10 transitions to the regular engine off state 56 from the low-clock engine off state 58.

After the image forming apparatus 10 transitions to the regular engine off state 56, the main unit power supply control unit 301 transmits an engine power-on request to the engine control unit 302 to turn on the power supply of the engine 116 (e.g., the plotter unit and the scanner unit) (step S79).

In response to the engine power-on request from the main unit power supply control unit 301, the engine control unit 302 turns on the power supply of the engine 116 (step S80). With the power supply of the engine 116 thus turned on in the regular engine off state 56, the power saving state of the image forming apparatus 10 transitions from the regular engine off state 56 to the standby state 51.

With steps S71 to S80 described above, the image forming apparatus 10 transitions from the low-clock engine off state 58 to the standby state 51.

If the return request is issued from the operation unit 20 or the FAX unit 40 in the high-clock engine off state 57, processes similar to those in FIG. 9 may be performed. In the high-clock engine off state 57, however, the CPU has a high clock frequency, and thus the processes of steps S75 and S76 in FIG. 9 may be omitted.

As described above, when not executing the incoming call determination, which increases a processing load on the CPU, the image forming apparatus 10 of the embodiment is placed in the low-clock engine off state 58, in which the clock frequency of the CPU is reduced. Then, when executing the incoming call determination, the image forming apparatus 10 is transitioned to the high-clock engine off state 57 to increase the clock frequency of the CPU. Thereby, the throughput of the CPU is increased, enabling normal execution of the incoming call determination and a reduction in the usage rate of the CPU.

Particularly in the incoming call determination process on the incoming call signal based on the FAX function, if the receipt of the incoming call signal is detected in the low-clock engine off state 58 of the image forming apparatus 10, the power supply of the FAX unit is turned on, and the clock frequency of the CPU is increased to transition the image forming apparatus 10 to the high-clock engine off state 57. Even if the incoming call signal is received in the low-clock engine off state 58, therefore, the increased clock frequency of the CPU enables normal execution of the incoming call determination function of determining whether the incoming call signal represents an incoming call or noise.

Further, when the incoming call determination process is completed in the high-clock engine off state 57, the image forming apparatus 10 is returned to the low-clock engine off state 58. Accordingly, the power consumption of the image forming apparatus 10 is reduced.

The image forming apparatus 10 described above is an MFP with at least the FAX function. However, the image forming apparatus 10 is not limited thereto. For example, the image forming apparatus 10 may be an MFP including a variety of communication devices involving clock control in the execution of a specific function related to communication and a unit that executes a specific function other than the FAX-related function. The present embodiment is applicable to any communication device including a communication circuit functioning as an executing unit that executes a specific function related to communication, such as a FAX unit, for example.

Further, if at least one of the functional units of the image forming apparatus 10 of the above-described embodiment is realized by execution of a program, the program is provided as previously stored in a ROM, for example. Further, the program executed in the image forming apparatus 10 of the embodiment may be provided as recorded on a computer-readable recording medium, such as a compact disc (CD)-ROM, a flexible disk (FD), a CD-recordable (CD-R), or a digital versatile disc (DVD), in the form of an installable or executable file. Further, the program executed in the image forming apparatus 10 of the embodiment may be stored in a computer connected to a network such as the Internet, and may be provided as downloaded from the computer via the network. Further, the program executed in the image forming apparatus 10 of the embodiment may be provided or distributed via the network such as the Internet. Further, the program executed in the image forming apparatus 10 of the embodiment is configured as a module including at least one of the above-described functional units. The functional units are loaded on and generated in main memory devices when the CPUs as actual hardware read and execute the programs from the above-described memory devices (e.g., the flash memory 104 and the storage 114).

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A communication device, comprising:
a communication circuit to execute a function related to communication; and
circuitry configured to
detect an input signal input to the communication circuit, wherein the communication circuit is a facsimile unit,
transition the communication device between a first power state, and a second power state in which the communication device consumes less power than in the first power state,
change a clock frequency of the communication circuit, and
when the input signal is detected in the second power state of the communication device, change the clock frequency of the communication circuit while maintaining the second power state,
wherein the circuitry is further configured to
determine a state of the power supply of the communication circuit,
turn on the power supply of the communication circuit when the input signal is detected,
increase the clock frequency when it is determined that the power supply of the communication circuit is on,
detect receipt of an incoming call signal by the facsimile unit,
when the receipt of the incoming call signal is detected, turn on a power supply of the facsimile unit, increase the clock frequency, and determine whether the incoming call signal represents an incoming call as the function related to communication, and
turn off the power supply of the facsimile unit when the incoming call signal represents noise, and reduce the clock frequency when it is determined that the power supply of the facsimile unit is off.

2. The communication device of claim 1, wherein the circuitry is further configured to increase the clock frequency, and when at least a predetermined time period elapses after the increase in the clock frequency, the circuitry is further configured to reduce the clock frequency.

3. The communication device of claim 1, wherein when a setting is made to disallow a reduction in the clock frequency, the circuitry is further configured to maintain the clock frequency even when a condition for reducing the clock frequency is met.

4. A communication controlling method for a communication device including a communication circuit that executes a function related to communication, the communication controlling method comprising:
detecting an input signal input to the communication circuit, wherein the communication circuit is a facsimile unit;
transitioning the communication device between a first power state, and a second power state in which the communication device consumes less power than in the first power state;
changing a clock frequency of the communication circuit; and
when the input signal is detected in the second power state of the communication device, changing the clock frequency of the communication circuit while maintaining the second power state, wherein the method further includes
determining a state of the power supply of the communication circuit;
turning on the power supply of the communication circuit when the input signal is detected;
increasing the clock frequency when it is determined that the power supply of the communication circuit is on;
detecting receipt of an incoming call signal by the facsimile unit;
when the receipt of the incoming call signal is detected, turning on a power supply of the facsimile unit, increasing the clock frequency, and determining whether the incoming call signal represents an incoming call as the function related to communication; and
turning off the power supply of the facsimile unit when the incoming call signal represents noise, and reducing the clock frequency when it is determined that the power supply of the facsimile unit is off.

5. A non-transitory recording medium storing a plurality of instructions for a communication device including a communication circuit that executes a function related to communication, the plurality of instructions, when executed by one or more processors, causing the processors to perform a method comprising:

detecting an input signal input to the communication circuit, wherein the communication circuit is a facsimile unit;
transitioning the communication device between a first power state, and a second power state in which the communication device consumes less power than in the first power state;
changing a clock frequency of the communication circuit; and
when the input signal is detected in the second power state of the communication device, changing the clock frequency of the communication circuit while maintaining the second power state, wherein the method further includes
determining a state of the power supply of the communication circuit;
turning on the power supply of the communication circuit when the input signal is detected;
increasing the clock frequency when it is determined that the power supply of the communication circuit is on;
detecting receipt of an incoming call signal by the facsimile unit;
when the receipt of the incoming call signal is detected, turning on a power supply of the facsimile unit, increasing the clock frequency, and determining whether the incoming call signal represents an incoming call as the function related to communication; and
turning off the power supply of the facsimile unit when the incoming call signal represents noise, and reducing the clock frequency when it is determined that the power supply of the facsimile unit is off.

* * * * *